March 24, 1925.  
K. O. SCHAUMAN  
1,531,139
VEHICLE BUMPER AND CONTROL MECHANISM
Filed June 2, 1923
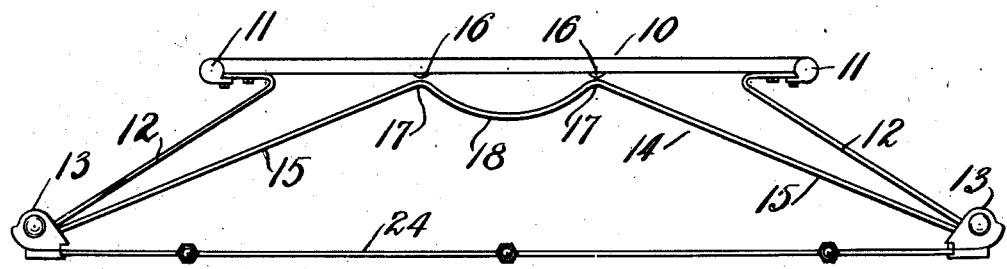
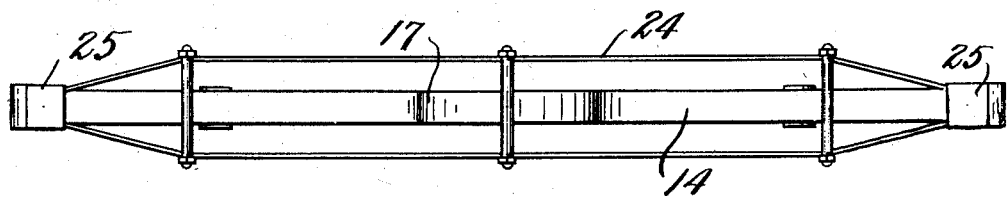
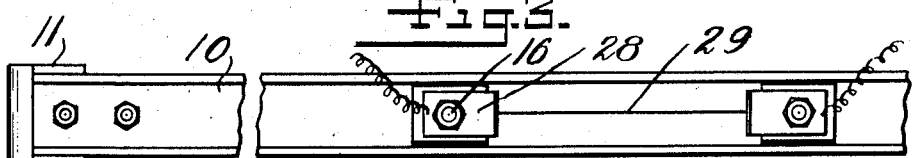
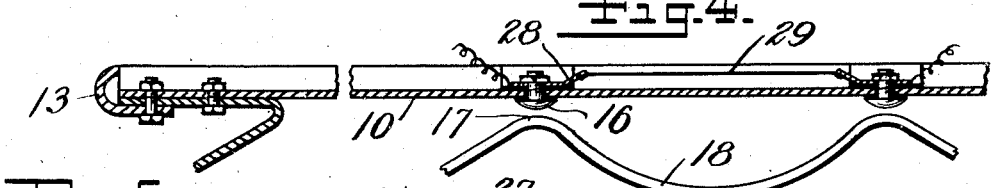
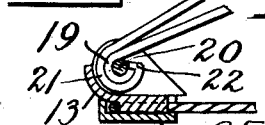
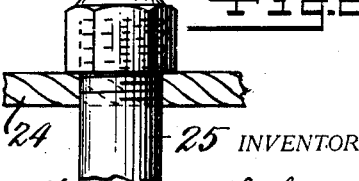
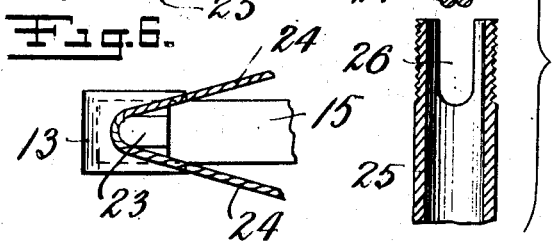
INVENTOR  
Karl Osten Schauman,  
BY  
Frank J Kent  
ATTORNEY Patented Mar. 24, 1925.

1,531,139

UNITED STATES PATENT OFFICE.

KARL OSTEN SCHAUMAN, OF NEW YORK, N. Y.

VEHICLE BUMPER AND CONTROL MECHANISM.

Application filed June 2, 1923. Serial No. 642,932.

*To all whom it may concern:*

Be it known that I, KARL OSTEN SCHAUMAN, a subject of Sweden, residing at New York, in the county of New York and State of New York, have invented certain new and useful Improvements in Vehicle Bumper and Control Mechanism, of which the following is a specification.

This invention relates to automatically operable control mechanism for vehicles and particularly to bumper actuated electrical control mechanism of the general type described and claimed in my Patent No. 1,450,262, of April 3, 1923.

The invention set forth in the patent referred to includes a frame member adapted to be mounted on the forward extremity of a vehicle and provided with forwardly and outwardly extending relatively rigid bracket members. Across the extremeities of the bracket members and in spanning relation thereto are stretched a plurality of sections of wire cable having a spaced apart relation in a vertical plane and adapted to provide a yielding and resilient bumper element adapted to inflict a minimum amount of injury on any object encountered thereby. Between the ends of the bracket members is mounted a rearwardly bowed spring member arranged to be deflected rearwardly to an increased degree by the impact of the bumper with an object and to make contact when thus deflected with an elongated convoluted contact member mounted on the forward face of the framework.

In the present invention the relatively rigid bracket members of the prior device are replaced by yieldable spring bracket members which support at their extremities cap members to which a loop of wire cable is adapted to be attached to provide a flexible and resilient bumper member. The extremities of the bracket members also serve to support an elongated spring contact member extending diagonally inward from both cap members toward points provided with insulated contacts on the main supporting framework. With this arrangement contact is invariably made between the spring contact member and the insulated contacts upon engagement of the flexible bumper element with an obstacle.

In the drawings, in which a preferred embodiment of the invention has been selected for illustration, Figure 1 is a plan view of an automobile bumper applying the invention.

Figre 2 is a view in front elevation of the device shown in Figure 1.

Figure 3 is a view in rear elevation of the main frame member showing contact members mounted thereon and insulated therefrom.

Figure 4 is a view in horizontal section of the parts shown in Figure 3.

Figure 5 is a sectional view showing a detail of the construction.

Figure 6 is a view taken at right angles to Figure 5 with a part removed.

Figure 7 is a sectional view showing in disassembled relation a cable spacer rod construction forming part of the invention.

Figure 8 is a view in side elevation of the parts shown in Figure 7 in assembled relation.

Referring to the drawings for a more detailed description of the invention, a bumper structure is disclosed which includes a main or base supporting frame member 10 which is preferably formed of a section of channel iron arranged to be supported in a horizontal position extending transversely of the forward extremity of the vehicle. The frame member 10 is provided with terminal clip members 11 which provide ornamental terminal pieces for the frame member and also provide holding or anchoring devices for a pair of spring bracket members 12 which extend forwardly and outwardly from the forward face of the frame piece 10.

The forward extremities of the spring bracket members 10 support a pair of cap pieces or terminal members 13 to which are also attached the terminals of an elongated spring bar 14 which includes diagonally extending portions 15 which terminate adjacent contact members 16 rigidly mounted on the main frame member 10. The spaced apart portions 17 of the spring bar which are positioned adjacent the contact members 16 are connected by a centrally disposed forwardly bowed portion 18 formed in the bar 14.

By reference to Figure 5 of the drawing it will be seen that the extremities of the spring bar 14 are coiled as at 19 about a post or bolt 20 carried by the cap piece 13 and that the terminal portions of the spring bracket members 12 are in turn coiled about the coils 20 as at 21 and are provided with angularly diverted end flanges 22 which directly engage the ends of the coils 20 and exert spring pressure thereon tending to normally hold the spring bar out of contact with the contact members 16.

The forward face of the cap pieces 13 is provided with an extension or lug 23 about which an endless length of wire cable 24 is looped and thereby supported in a transverse position across the forward or rearward extremity of the vehicle. Holding pieces 25 may be attached to the cap members 13 in any suitable manner to cover and hold the cable loops in place in the cap members.

It will be seen that the cable 24 which may be formed into an endless loop by a splicing or welding operation, provides two vertically spaced apart stretches extending between the cap members 13 and that the cable stretches are maintained in their normal spaced apart relation by spacer members 25 which consist of tube sections slotted as at 26 at their ends to receive the cable and having screw cap members 27 for attaching the parts together.

The contact members 28 are insulated from the bar 10 as indicated in Figure 4 and are electrically connected by the conductor section 29 so that if either or both contacts are engaged by the spring bar 14 a circuit will be closed to bring about the operation of vehicle stopping mechanism and thereby automatically bring the vehicle to a stop.

The described organization of structure is such that engagement of the spring bar 14 with the contacts is assured when inward deflection of the resilient cable stretches is produced by contact with an obstacle in the path of the vehicle. A material contribution in this result is brought about by the bending or yielding of the spring bracket members 12 when the cable stretches strike an object in the roadway.

What I claim is:

1. In a vehicle bumper construction, a rigid frame member arranged to be mounted transversely of an extremity of a vehicle, outwardly extending spring bracket members carried by the frame member, a spring bar having its terminals attached to the terminals of the spring bracket members and having a conformation such that a portion thereof occupies a position adjacent the frame member, and a flexible cable member stretched between the terminals of the spring bracket members whereby upon engagement of the cable with an object the bracket members will be deflected toward each other to force the spring bar into direct contact with the frame member to thereby affect electrical control mechanism.

2. In a vehicle bumper construction, a frame member arranged to be mounted transversely of the forward extremity of a vehicle, outwardly and forwardly extending spring bracket members carried by the end portions of the frame member, cap members for the terminals of the spring bracket members, a spring bar having its terminals attached to the cap members, said bar being bent rearwardly between its ends to a position adjacent the frame member, and an endless cable looped over the cap members and stretched taut therebetween.

3. In a vehicle bumper construction, a rigid frame member arranged to be mounted transversely of the forward extremity of a vehicle, a contact fixed with respect to said frame member, outwardly and forwardly extending spring bracket members carried by the end portions of the frame member, cap members for the terminals of the spring bracket members, a spring bar having its terminals attached to the cap members, said bar being bent rearwardly between its ends to a position adjacent the said contact, said terminals of the spring bracket members and said terminals of the spring bar being interengaged whereby the spring bracket members will normally hold the spring bar out of contact with the said contact, and a cable looped over the cap members and having two vertically spaced apart stretches extending therebetween.

4. In a vehicle bumper construction, a rigid frame member arranged to be mounted transversely of the forward extremity of a vehicle, outwardly and forwardly extending spring bracket members carried by the end portions of the frame member, cap members for the terminals of the spring bracket members, a spring bar having its terminals attached to the cap members and having inwardly and rearwardly extending portions forming an acute angle with the spring bracket members, the rearward portions of the spring bar occupying spaced apart positions adjacent the frame member, the adjacent ends of said portions being movable toward each other when the said spring bar is bent, and a flexible cable member attached to said cap members and stretched taut therebetween.

5. In a vehicle bumper construction, a frame member arranged to be mounted transversely of the forward extremity of a vehicle, outwardly and forwardly extending spring bracket members carried by the end portions of the frame member, cap members for the terminals of the spring bracket members, a spring bar having its terminals attached to the cap members and having inwardly and rearwardly extending portions forming an acute angle with the spring bracket members, the rearward portions of the spring bar occupying spaced apart positions adjacent the frame member and connected by a forwardly bowed portion of the spring bar, said terminals of the spring bracket members and of the spring bar being so interengaged that the spring bracket members normally hold the spring bar out of contact with the frame member, and a flexible cable connecting the cap members and stretched taut therebetween.

In testimony whereof I affix my signature.

KARL OSTEN SCHAUMAN.